United States Patent
Shenoy (10) Patent No.: US 10,387,056 B2
(45) Date of Patent: *Aug. 20, 2019

(54) OBFUSCATION-ENHANCED MEMORY ENCRYPTION

(71) Applicant: Micron Technology, Inc., Boise, ID (US)

(72) Inventor: Jayarama N. Shenoy, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,162

(22) Filed: Dec. 18, 2018

(65) Prior Publication Data

US 2019/0121557 A1 Apr. 25, 2019

Related U.S. Application Data

(63) Continuation of application No. 16/124,230, filed on Sep. 7, 2018, now Pat. No. 10,180,804, which is a continuation of application No. 15/447,822, filed on Mar. 2, 2017, now Pat. No. 10,082,975.

(51) Int. Cl.
*G06F 12/00* (2006.01)
*G06F 3/06* (2006.01)
*G06F 12/14* (2006.01)

(52) U.S. Cl.
CPC .......... *G06F 3/0623* (2013.01); *G06F 3/0659* (2013.01); *G06F 3/0661* (2013.01); *G06F 3/0673* (2013.01); *G06F 3/0679* (2013.01); *G06F 12/1408* (2013.01); *G06F 2212/1052* (2013.01); *G06F 2212/402* (2013.01)

(58) Field of Classification Search
None
See application file for complete search history.

(56) References Cited

U.S. PATENT DOCUMENTS

| | | | |
|---|---|---|---|
| 4,780,905 A | 10/1988 | Cruts et al. | |
| 5,123,045 A | 6/1992 | Ostrovsky et al. | |
| 5,729,766 A | 3/1998 | Cohen | |
| 6,023,506 A | 2/2000 | Ote et al. | |
| 6,088,452 A | 7/2000 | Johnson et al. | |
| 6,633,807 B2 | 10/2003 | Augsburger et al. | |
| 6,643,775 B1 | 11/2003 | Granger et al. | |
| 8,307,354 B2 | 11/2012 | Haga et al. | |
| 8,612,743 B2 | 12/2013 | Holland et al. | |
| 8,843,767 B2 | 9/2014 | Hars et al. | |
| 9,117,094 B2 | 8/2015 | Anckaert et al. | |

(Continued)

OTHER PUBLICATIONS

International Search Report and Written Opinion from related international application No. PCT/US2018/019830, dated Jun. 12, 2018, 10 pp.

*Primary Examiner* — John A Lane
(74) *Attorney, Agent, or Firm* — Brooks, Cameron & Huebsch, PLLC (57) ABSTRACT

The present disclosure includes apparatuses and methods for obfuscation-enhanced memory encryption. An example method comprises performing a write operation, wherein the write operation includes transmitting a number of write transactions received from a host along with a number of spurious transactions to a memory, and wherein the number of spurious transactions are transmitted at a particular rate among the number of received write transactions.

20 Claims, 6 Drawing Sheets

(56) References Cited

U.S. PATENT DOCUMENTS

| | | |
|---|---|---|
| 9,495,111 B2 | 11/2016 | Hars et al. |
| 2003/0018608 A1 | 1/2003 | Rice et al. |
| 2004/0003278 A1 | 1/2004 | Chen et al. |
| 2008/0189558 A1 | 8/2008 | Hughes et al. |
| 2009/0327709 A1 | 12/2009 | Garner et al. |
| 2010/0106920 A1 | 4/2010 | Anckaert et al. |
| 2013/0013934 A1 | 1/2013 | King et al. |
| 2013/0117577 A1 | 5/2013 | Hars et al. |
| 2014/0279104 A1 | 9/2014 | Grube et al. |
| 2015/0161414 A1 | 6/2015 | Pandian et al. |
| 2015/0234751 A1 | 8/2015 | Van Der Sluis et al. |
| 2016/0026824 A1 | 1/2016 | Hars |
| 2016/0048457 A1 | 2/2016 | Hars |
| 2016/0103626 A1 | 4/2016 | Hars et al. |
| 2016/0299765 A1 | 10/2016 | Wesie et al. |
| 2017/0061138 A1 | 3/2017 | Lambert |
| 2017/0289237 A1 | 10/2017 | Feltham et al. |

↓ GENERATE AND INSERT SPURIOUS TRANSACTIONS 534-4 — | 1 0 1 1 0 0 1 0 |
532-8 — 1 0 1 1 0 0 1 0
532-7 — 1 1 1 0 1 1 1 1
534-3 — | 0 1 1 1 0 0 0 0 |
532-6 — 0 0 0 1 1 0 1 0
532-5 — 0 1 1 1 0 0 0 0
534-2 — | 1 1 0 1 1 0 0 1 |
532-4 — 1 0 0 1 0 0 0 1
532-3 — 0 1 0 0 1 1 1 0
534-1 — | 0 0 1 0 1 0 1 0 |
532-2 — 1 1 0 1 0 1 1 1
532-1 — 1 0 0 1 1 1 0 0

OBFUSCATION-ENHANCED MEMORY ENCRYPTION

PRIORITY INFORMATION

This application is a Continuation of U.S. application Ser. No. 16/124,230, filed Sep. 7, 2018, which is a Continuation of U.S. application Ser. No. 15/447,822, filed Mar. 2, 2017, now U.S. Pat. No. 10,082,975, the contents of which are incorporated herein by reference.

TECHNICAL FIELD

The present disclosure relates generally to semiconductor memory apparatuses and methods, and more particularly, to obfuscation-enhanced memory encryption.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. In various instances, a memory system can include primary memory (e.g., main memory) and secondary memory (e.g., storage memory). Secondary memory is often non-volatile memory, is used to store programs, applications, and data on a relatively long term basis relative to main memory, and often has a much larger capacity relative to primary memory. Primary memory is often volatile, has faster access times relative to storage memory, and often temporarily stores programs, applications, and data being accessed by a host (e.g., processor, CPU, etc.). In various instances, primary memory may be directly accessible by a host processor while secondary memory may not. However, as memory technologies advance, some storage memories (or at least portions thereof) may be directly accessible by a host processor, allowing them to serve as at least a portion of main memory.

Additionally, as memory technologies advance, various non-volatile memories are being used and/or considered for use as main memory (e.g., as alternatives to DRAM). However, using non-volatile memory as main memory can introduce some security vulnerabilities that may be less of a concern with volatile memory such as DRAM. For example, since data is retained in non-volatile memory after power-off, it can be more susceptible to being compromised via various methods such as bus-snooping and/or probing the physical memory while the device is powered off, among various other methods, which may provide access to sensitive data such as cryptographic keys that often reside in main memory. Although several approaches have been proposed to solve various security concerns through data encryption, they have some limitations such as relatively high design complexity and non-trivial latency/energy overhead.

DETAILED DESCRIPTION

The present disclosure includes apparatuses and methods for obfuscation-enhanced memory encryption. An example method comprises performing a write operation, wherein the write operation includes transmitting a number of write transactions received from a host along with a number of spurious transactions to a memory, and wherein the number of spurious transactions are transmitted at a particular rate among the number of received write transactions.

Embodiments of the present disclosure can provide a flexible data security solution for primary memory (e.g., randomly accessible main memory) that provides benefits such as enhanced data security while providing reduced levels of transactional latency as compared to previous approaches. For example, a number of embodiments can provide improved protection of randomly accessible non-volatile memory against various attacks such as when an attacker may have user space access to the memory, which may allow the attacker to direct specific sets of memory transactions, and/or when an attacker may have physical access to the memory, which may allow bus-snooping, among various other types of attacks that may comprise data security and/or confidentiality. Various embodiments can provide enhanced security of non-volatile main memory without encrypting all of the data stored in the memory. Encrypting all data stored in memory (e.g., randomly accessible memory) can be effective for data security, but can adversely affect system latency, and the latency issues can be increased in main memory since main memory content often changes more frequently as compared to storage memory.

As used herein, a memory transaction can refer to an operation that involves moving a particular amount of data (e.g., 8 bytes, 64 bytes, 128 bytes, 2 KB, etc.) between a host (e.g., processor) and a memory. In various instances, a controller is configured to write, to the memory, the data corresponding to write transactions received from the host and/or configured to read, from the memory, the data corresponding to read requests received from the host. The memory can be, for example, non-volatile memory serving as at least a portion of main memory for a memory system. In various embodiments, the memory can be a randomly accessed (e.g., byte addressable) memory as opposed to a block addressable memory (e.g., a NAND Flash memory in which logical block addressing is used).

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M" and "N", particularly with respect to reference numerals in the drawings, indicates that a number of the particular feature so designated can be included. As used herein, "a number of" a particular thing can refer to one or more of such things (e.g., a number of memory devices can refer to one or more memory devices).

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
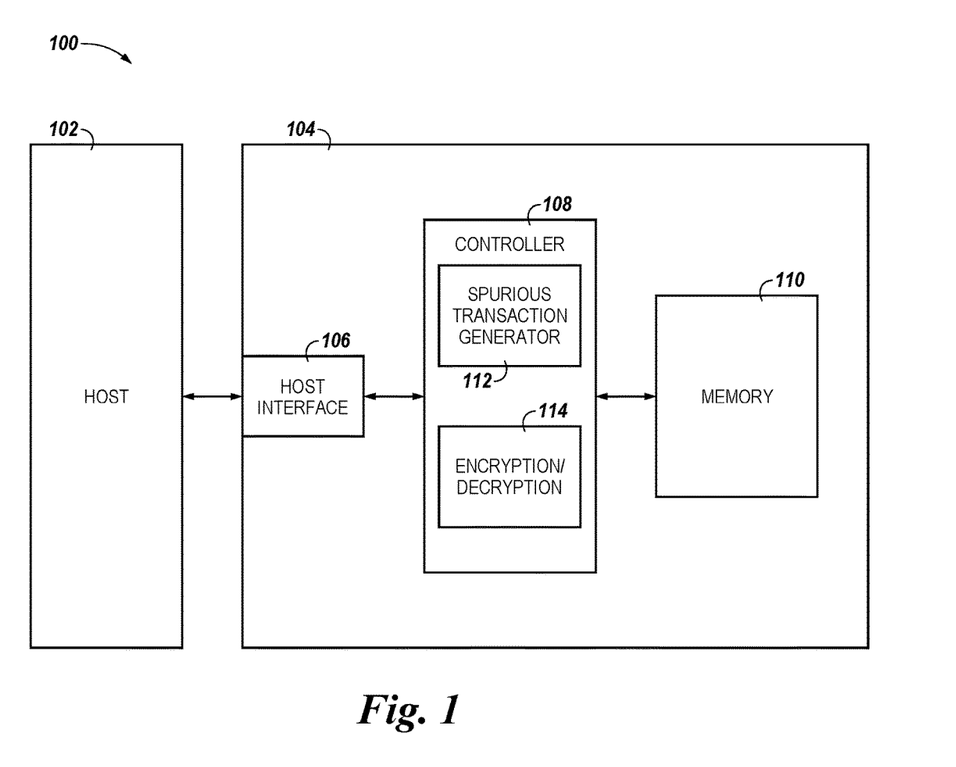
FIG. 1 is a block diagram of an apparatus in the form of a computing system including a memory system comprising a controller configured to control obfuscation-enhanced encryption in accordance with a number of embodiments of the present disclosure.
Figure 6:
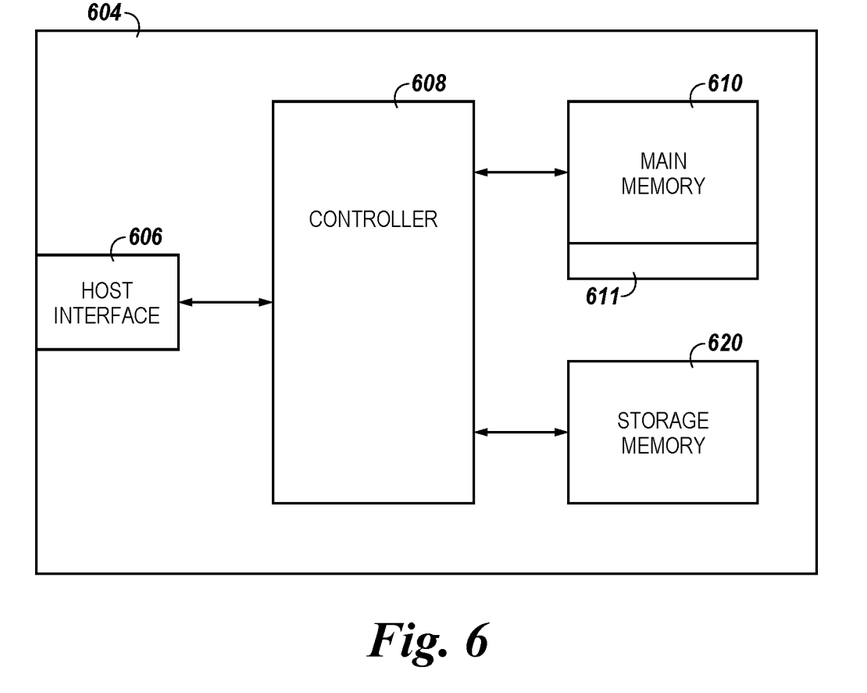
FIG. 6 is a block diagram of an apparatus in the form of a memory system comprising a controller configured to control obfuscation-enhanced encryption in accordance with a number of embodiments of the present disclosure.

FIG. 1 is a block diagram of an apparatus in the form of a computing system 100 including a memory system 104 comprising a controller 108 configured to control obfuscation-enhanced encryption in accordance with a number of embodiments of the present disclosure. As used herein, a memory system 104, a controller 108, or a memory 110 might also be separately considered an "apparatus." The memory system 104 can be a solid state drive (SSD), a DIMM (dual in-line memory module), or a NV-DIMM (non-volatile DIMM), for instance, and can include a host interface 106, a controller 108 (e.g., a sequencer and/or other control circuitry), and a memory 110. Although not shown in FIG. 1, the memory 110 can comprise, for instance, a number of DRAM devices, solid state memory devices such as NAND flash devices, and/or 3D XPoint memory devices, among other types of memory devices, which provide a storage volume for the memory system 104. As an example, the memory 110 can serve as primary memory for system 104; however, embodiments are not so limited. For example, and as shown in FIG. 6, a memory system can include primary memory (e.g., Main Memory 610) and secondary memory (Storage Memory 620). In a number of embodiments, and a shown in FIG. 1, the memory 110 can comprise a portion 111 dedicated for storing data corresponding to spurious transactions, as described further herein.

The controller 108 can be coupled to the host interface 106 and to the memory 110 via a plurality of channels and can be used to transfer data between the memory 110 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices (e.g., a number of processors).

The controller 108 can communicate with the memory 110 (which in some embodiments can be a number of memory arrays on a single die) to control data read, write, and erase operations, among other operations. As an example, the controller 108 can be on a same die or a different die than a die or dice corresponding to memory 110.

Although not specifically illustrated, the controller 108 can include a discrete memory channel controller for each channel coupling the controller 108 to the memory 110. Additionally, the controller 108 can include discrete controllers for main memory (e.g., 610 shown in FIG. 6) and storage memory (e.g., 620 shown in FIG. 6). The controller 108 can include, for example, a number of components in the form of hardware and/or firmware (e.g., one or more integrated circuits) and/or software for controlling access to the memory 110 and/or for facilitating data transfer between the host 102 and memory 110.

As illustrated in FIG. 1, the controller 108 can include a spurious transaction generator 112 and an encryption/decryption component 114. The component 112 may include circuitry configured to generate spurious transactions in association with obfuscation-enhanced memory encryption in accordance with a number of embodiments described herein. As described further herein, in a number of embodiments, the controller 108 can autonomously generate memory transactions (e.g., write transactions and/or read transactions which are controller-initiated and not generated by a host) to be included among memory transactions initiated by host 102. The component 112 can also reorder memory transactions (e.g., alter the sequence in which the transactions are executed) initiated by host 102. In a number of embodiments, the frequency at which spurious memory transactions are generated and included among host-initiated memory transactions is a programmable fraction, which can provide an ability to balance increased security (e.g., a relatively greater number of spurious transactions) versus increased overhead associated with encryption. In a number of embodiments, the rate at which spurious memory transactions are generated can be adjusted (e.g., by controller 108) based on various factors, such as responsive to detection of an increased locality of write patterns (e.g., increased writes to a particular address or address range).

The component 114 can include, for example, circuitry configured to encrypt and/or decrypt a number of transactions received from a host and/or retrieved from memory, as described further herein. For instance, the component 114 can encrypt a number of transactions received from the host 102 in accordance with various encryption algorithms. For example, the component 114 may utilize the Advanced Encryption Standard (AES), which is a block cipher encryption, and implements the Rijndael algorithm. In some embodiments, the AES may be employed as an electronic code book (ECB), with no feedback. For example, identical data inputs may yield in identical data outputs when encrypted with no feedback. In some embodiments, the AES may be used in one of several feedback modes of operation such as Cipher Block Chaining (CBC), Cipher Feedback (CFB), and Output Feedback (OFB). In these modes, the output of the AES algorithm is fed back to the data input such that even identical data inputs (unencrypted) does not necessarily yield in identical data outputs when encrypted. Further, the component 114 can decrypt a number of transactions retrieved from memory 110 using a proper memory decryption algorithm. The components 112 and 114 are not limited to circuitry (e.g., hardware) implementations. For instance, the components 112 and/or 114 can be implemented in hardware, firmware, and/or software.

The components 112 and 114 can be discrete components such as an application specific integrated circuit (ASIC), or the components may reflect functionally provided by circuitry within the controller 108 that does not necessarily have a discrete physical form separate from other portions of the controller 108. Although illustrated as components within the controller 108 in FIG. 1, the components 112 and 114 can be external to the controller 108 or can have a number of components located within the controller 108 and a number of components located external to the controller 108.

Although not shown in FIG. 1, the controller 108 can also include an error correction circuit such as one of the group including a Bose-Chaudhuri-Hocquenghem (BCH) error correction circuit and a Reed-Solomon error correction circuit, among other types of error correction circuits. The error correction circuit can be used to detect, as well as to correct, data errors. Additionally, the error correction component can include error encoding and decoding functionality.

Figure 2:
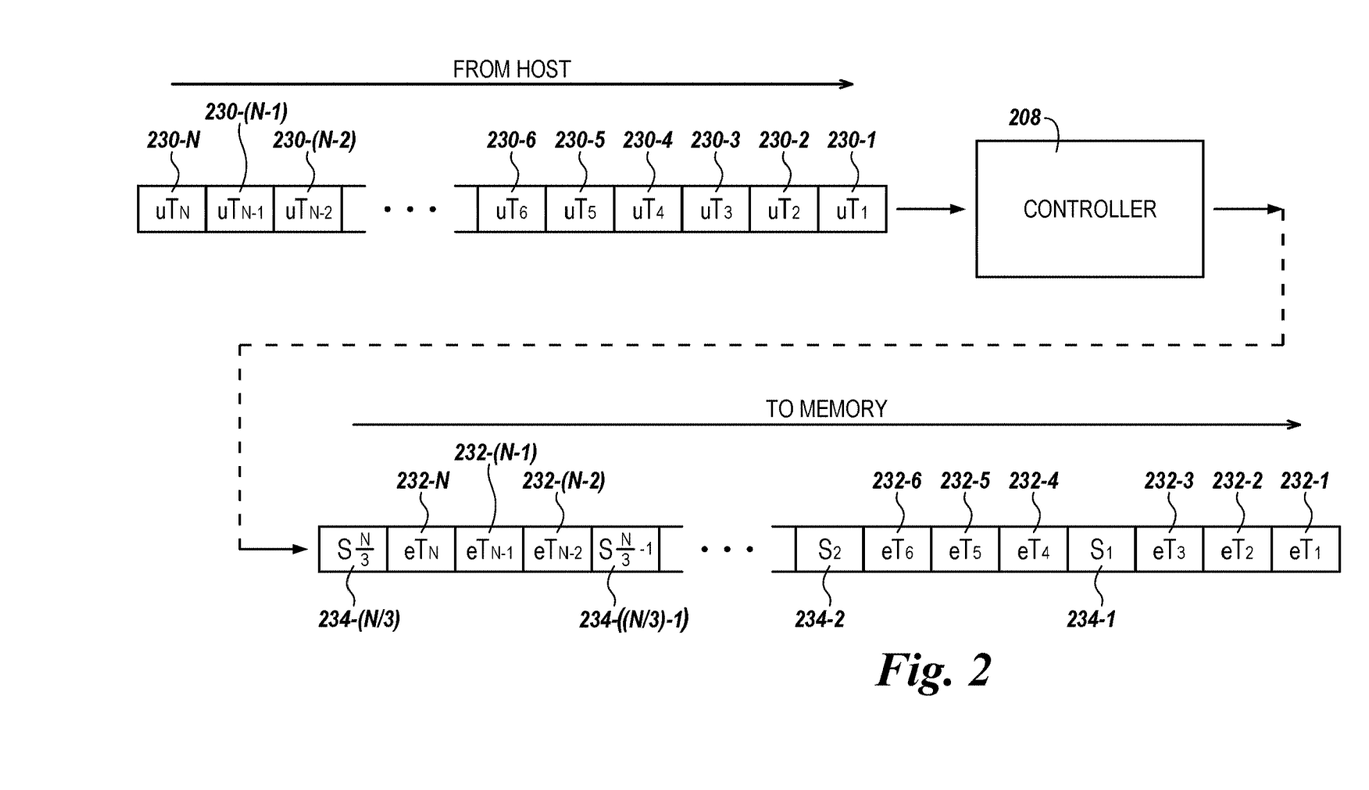
FIG. 2 illustrates a diagram associated with generating spurious transactions in accordance with a number of embodiments of the present disclosure.

FIG. 2 illustrates a diagram associated with generating spurious transactions in accordance with a number of embodiments of the present disclosure. In FIG. 2, "uT" (e.g., $uT_1$ 230-1 to $uT_N$ 230-N) represents unencrypted write transactions (e.g., write transactions initiated by a host such as host 102 and received by a controller such as controller 108), "eT" (e.g., $eT_1$ 232-1 to $eT_N$ 232-N) represents encrypted write transactions (e.g., write transactions transmitted to a memory such as memory 110 from a controller such as controller 108), and "S" (e.g., $S_1$ 234-1 to $S_{N/3}$ 234-(N/3)) represents spurious transactions (e.g., transactions generated by a controller such as controller 108 as opposed to transactions generated by a host such as host 102). The unencrypted transactions 230-1 to 230-N, encrypted transactions 232-1 to 232-N, and spurious transactions 234-1 to 234-(N/3) will be referred to generically as transactions 230, 232, and 234, respectively. In FIG. 2, the subscripts associated with the unencrypted transactions 230 and encrypted write transactions 232 indicate corresponding transactions. For example, $uT_1$ and $eT_1$ correspond to the same transaction such that $eT_1$ is the encrypted version of $uT_1$. Similar notation is used in FIGS. 3 and 4 with respect to unencrypted, encrypted, and spurious transactions.

As shown in FIG. 2, a controller 208 receives a number of unencrypted write transactions 230 from a host (e.g., host 102). Each write transaction can include a particular amount of data (e.g., one or more bytes) and an associated address. As an example, for byte addressable memories, each transaction 230 may correspond to a single byte of data; however, embodiments are not so limited and each transaction may comprise 64 or 128 bytes of data, for instance.

The number of write transactions 230 initiated from the host can be encrypted by controller 208, resulting in corresponding encrypted transactions 232, and the encrypted data can be written to memory (e.g., memory 110). In a number of embodiments, encrypting the transactions 230 can include generating physical addresses (e.g., of memory 110) by encrypting the addresses corresponding to the transactions 230 and then using the generated physical addresses as seeds for pseudo counter mode (PCTR) encryption of the data. As an example, the encrypted addresses can be an electronic code book (ECB) map from the physical address space of memory 110, which can reduce complexity associated with subsequent decryption when read from the memory. Encrypting addresses using an ECB technique and encrypting data using a PCTR technique can provide benefits such as reduced levels of transactional latency as compared to various other encryption techniques. Additionally, such encryption techniques may provide for stateless encryption, which can maintain random accessibility to memory. A number of embodiments can provide for encryption of main memory (e.g., RAM), for example, while still providing for relatively low latency and random accessibility.

In addition to generating the encrypted transactions 232 from the host-initiated transactions 230, the controller 208 is configured to generate a number of spurious transactions 234 comprising data to be written to memory along with the data corresponding to the encrypted transactions 232. The spurious transactions 234 can be generated at a particular rate (e.g., one spurious transaction 234 per four, five, eight, sixteen, twenty, etc., host-initiated transaction), which can be variable and/or selectable by the controller 208. The particular rate (e.g., the percentage of transactions that are generated by the controller as spurious transactions designed to confound an observer) may be adjusted (e.g., by controller 208) based on various factors. For instance, the controller 208 may be configured to track locality of write addresses and may increase the rate of generated spurious transactions responsive to determining repetitive writes to a same address and/or address range reaches a threshold value. In a number of embodiments, the rate of spurious transaction generation can be adjusted during operation (e.g., at runtime) to increase or decrease the security level associated with the encrypted transactions 232.

In a number of embodiments, the spurious transactions 234 can be written to a dedicated portion of memory (e.g., portion 111 shown in FIG. 1), which can facilitate the read/decryption process as the controller 208 can be configured to discard those reads from the dedicated portion 111 of the memory. The amount of memory 110 dedicated to portion 111 can vary and can depend on various factors such as the rate at which spurious transactions 234 are generated, among others. The data corresponding to the spurious transactions 234 can be random data generated by the controller 208 (e.g., via a random number generator), for example. The data corresponding to the encrypted host-initiated write transactions 232 can be written to memory along with the data corresponding to the spurious controller-generated write transactions, thereby providing a level of obfuscation. In a number of embodiments, the spurious transactions 234 can be autonomously generated by controller 208 such that an external component (e.g., host 102) is unaware of which transactions are controller-generated and is unaware of the values of the data corresponding to those spurious transactions.

The example shown in FIG. 2 illustrates spurious transaction rate of 25%. For instance, as shown in FIG. 2, one out of every four transactions is a spurious transaction 234. In this example, the encrypted transactions 234 are written to memory sequentially in the order in which they were received from the host. For instance, transactions 232-1 through 232-N are processed consecutively in order with spurious transactions 234-1 through 234-(N/3) being processed after every third encrypted transaction 232. In this example, the total number of transactions written to memory is equal to "N" encrypted write transactions 232 corresponding to the "N" host-initiated write transactions 230 plus "N/3" spurious controller-generated write transactions. As described further herein, embodiments are not limited to the example shown in FIG. 2. For example, in a number of embodiments, the controller 208 can be configured to re-order the transactions 230 received from the host such that they are not processed in sequential order.

Transmitting both the spurious transactions 234 and write transactions 232 to memory via a same data bus confound an attacker who may, for instance, have user space access to a system (e.g., system 100). For example, an attacker with the user space access may be able to input a particular set of memory transactions to the system, and then probe a physical bus between a controller (e.g., 108) and a memory (e.g., 110) to observe in what form the particular set of memory transactions are being transmitted to the memory via the bus. In such instances, the attacker may be able to determine a particular encryption algorithm by monitoring the data patterns provided to the controller as compared to the data patterns transferred over the bus to the memory. However, transmitting controller-generated spurious transactions over the bus along with the number of write transactions, in accordance with embodiments described herein, can assist with further confounding an attacker with such access to a system.

Figure 3:
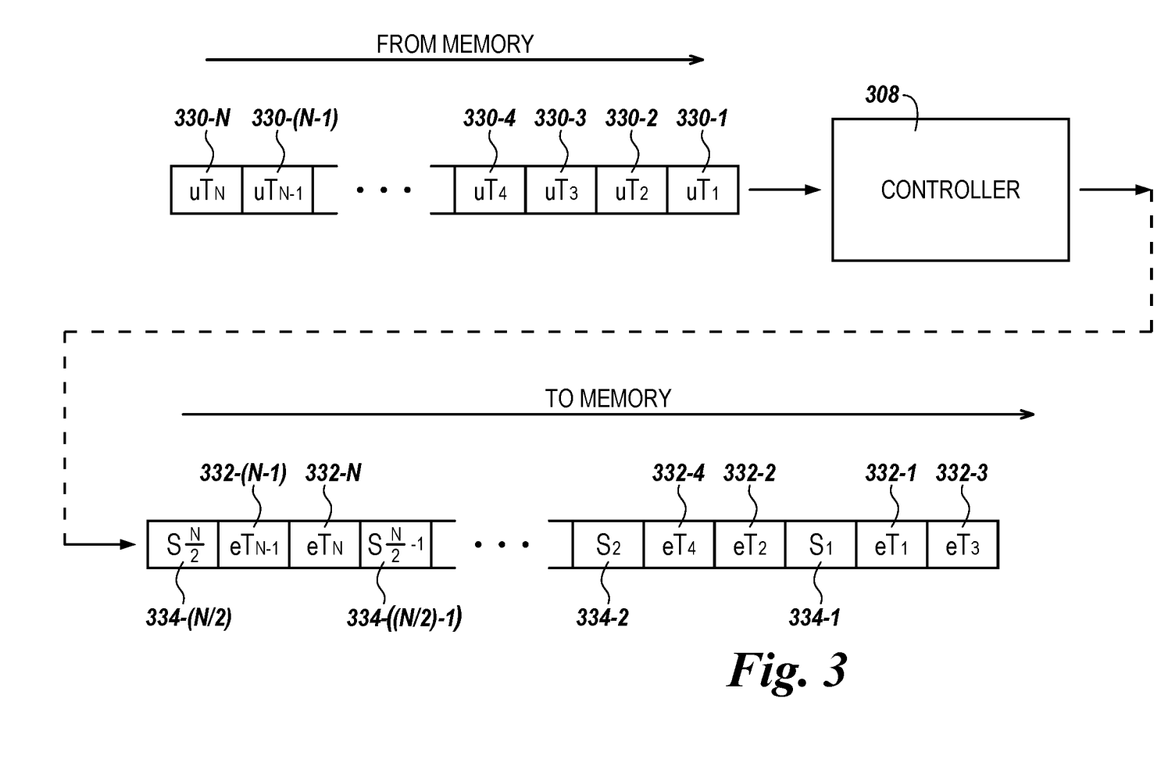
FIG. 3 illustrates a diagram associated with generating spurious transactions in accordance with a number of embodiments of the present disclosure.

FIG. 3 illustrates a diagram associated with generating spurious transactions in accordance with a number of embodiments of the present disclosure. In FIG. 3, "uT" (e.g., $uT_1$ 330-1 to $uT_N$ 330-N) represents unencrypted host-initiated write transactions, "eT" (e.g., $eT_1$ 332-1 to eTN 332-N) represents encrypted write transactions, and "S" (e.g., $S_1$ 334-1 to $S_{N/2}$ 334-(N/2)) represents controller-generated spurious transactions. The unencrypted transactions 330-1 to 330-N, encrypted transactions 332-1 to 332-N, and spurious transactions 334-1 to 334-(N/2) will be referred to generically as transactions 330, 332, and 334, respectively.

As shown in FIG. 3, a controller 308 receives a number of unencrypted write transactions 330 from a host (e.g., host 102). Each write transaction can include a particular amount of data (e.g., one or more bytes) and an associated address. The example shown in FIG. 3 illustrates spurious transaction rate of 33%. For instance, as shown in FIG. 3, one out of every three transactions is a spurious transaction 334. Unlike the example shown in FIG. 2, in which the encrypted transactions (e.g., 234) were written to memory sequentially in the order in which they were received from the host, in this example, the controller 308 is configured to re-order the transactions 330 received from the host such that they are not processed in sequential order. For instance, transaction 332-3 is written to memory before transaction 332-1 and 332-2. The re-ordering of the transactions by the controller 308 can be done in an autonomous fashion such that the re-ordering is hidden from the host. Re-ordering the sequence in which transactions received from the host are written to memory can also serve to confound an attacker who may have user space access to a system. The re-ordering of the transactions by controller 308 can be performed in a variety of manners. For example, the transactions may be re-ordered randomly in accordance with a particular algorithm, or may be re-ordered according to a more simple method such as writing the transactions consecutively in reverse order (e.g., such that transaction 332-N is written to memory first and transaction 332-1 is written to memory last), among various other re-ordering possibilities.

As shown in FIG. 3, the re-ordering of transactions by controller 308 can occur in complement to controller-generated spurious transactions 334; however, embodiments are not so limited. For instance, a number of embodiments may involve the controller 308 reordering the transactions received from the host but not including spurious transactions 334 among the re-ordered transactions.

Figure 4:
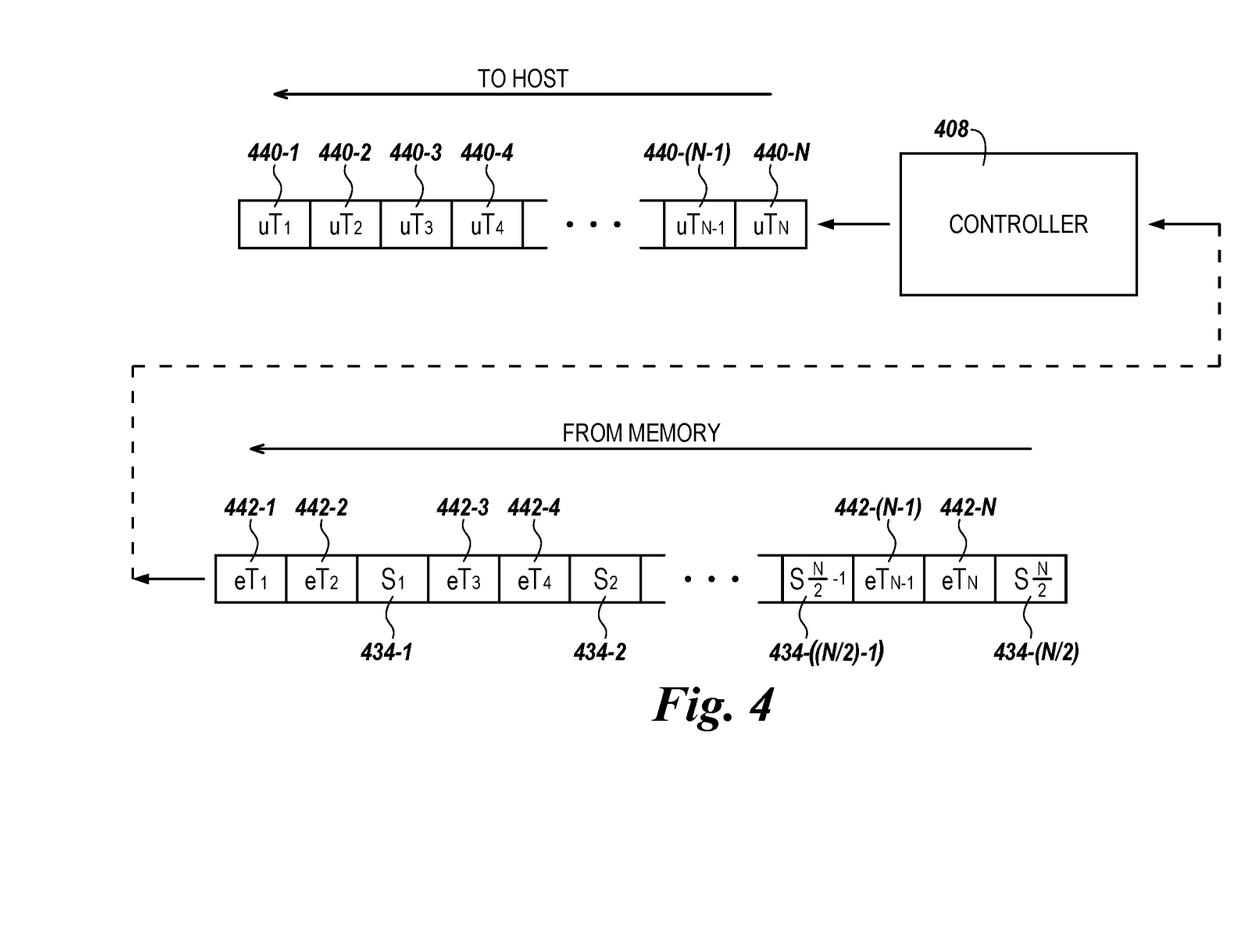
FIG. 4 illustrates a diagram associated with decrypting data read from memory which has been encrypted in accordance with an obfuscation-enhanced encryption method according to the present disclosure.

FIG. 4 illustrates a diagram associated with decrypting data read from memory which has been encrypted in accordance with an obfuscation-enhanced encryption method according to the present disclosure. FIG. 4 includes a controller 408, which can be a controller such as controller 108 shown in FIG. 1. The controller 408 is configured to, responsive to host-initiated read transactions (e.g., 440-1 to 440-N), read and decrypt corresponding encrypted transactions (e.g., 442-1 to 442-N) previously written to memory along with a number of corresponding controller-initiated spurious transactions (e.g., 434-1 to 434-(N/2)). The controller 408 can also be configured to re-order the read transactions 442, as appropriate, such that the decrypted read transactions 440 are returned to the host (e.g., host 102) in the proper sequence.

The reading, by the controller 408, of the data corresponding to the spurious transactions 434 along with the data corresponding to the encrypted transactions 434 can serve to provide a level of security by confounding an observer (e.g., attacker) who may have access to a data bus between the memory and controller 408. In a number of embodiments, the data corresponding to the spurious transactions 434 are written to a dedicated portion of memory (e.g., portion 111 shown in FIG. 1), and the controller 408 can be configured to discard reads from the dedicated address space such that the corresponding data is not returned to the host, as shown in FIG. 4.

Figure 5:
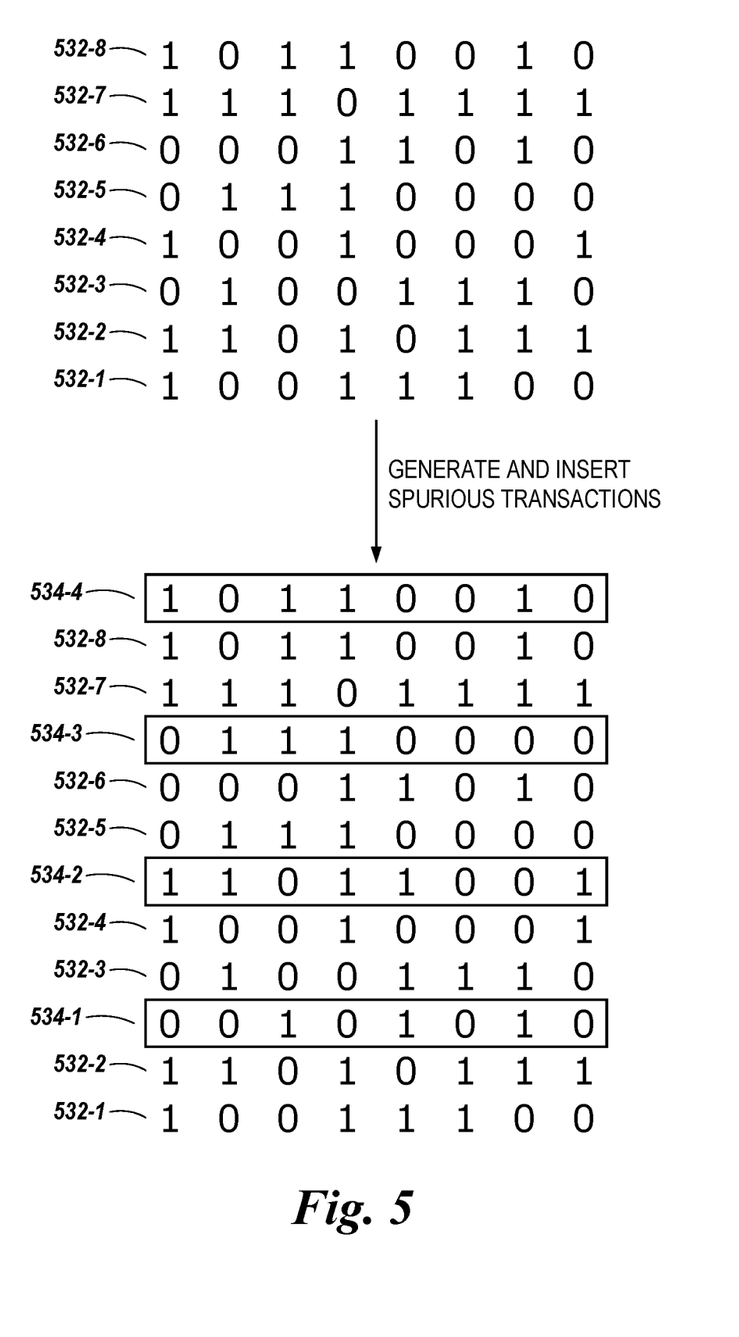
FIG. 5 illustrates an example of particular data values corresponding to spurious transactions generated in accordance with a number of embodiments of the present disclosure.

FIG. 5 illustrates an example of particular data values corresponding to spurious transactions generated in accordance with a number of embodiments of the present disclosure. In FIG. 5, the transactions 532-1 to 532-8 (referred to generally as transactions "532") represent 8-bit write transactions. In this example, the write transactions 532 are encrypted transactions (e.g., the data has already been received from a host and encrypted by a controller).

As described above, the transactions 532 can be encrypted in accordance with various encryption algorithms. In this example, a controller (e.g., 108, 208, 308, 408) is configured to generate spurious transactions (e.g., 534) at a rate of 33% (e.g., one of every three write transactions written to memory is a controller-initiated write transaction). The particular data values corresponding to the spurious write transactions 534 can be randomly generated by a random number generator of the controller, for instance. However, embodiments are not so limited. For example, the controller can be configured to use previously written data values for the spurious transactions and/or as a seed for encryption associated with spurious writes, which may provide benefits such as further confounding a dictionary attack.

FIG. 6 is a block diagram of an apparatus in the form of a memory system 604 comprising a controller 608 configured to control obfuscation-enhanced encryption in accordance with a number of embodiments of the present disclosure. In this example, the system 604 includes a host interface 606 through which controller 608 can communicate with a host such as host 102 shown in FIG. 1. Controller 608 is configured to transfer data between memories 610/620 and a host. In this example, memory 610 serves as a main memory for system 604 and memory 620 serves as storage memory for system 604. Memory 610 can be a non-volatile and randomly accessible memory; although, embodiments are not so limited. As described above, providing a main memory which is non-volatile can have various enhanced security risks as compared to volatile main memory (e.g., SRAM, DRAM, etc.). In this example, memory 610 includes a portion 611 dedicated for storing controller-generated spurious memory transactions as described herein.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a memory; and
    a processing device coupled to the memory, the processing device configured to perform a write operation that transmits, to the memory, a number of write transactions along with a number of spurious transactions;
    wherein the number of write transactions are reordered such that they are executed in a different sequence than a particular sequence in which they were received at the processing device via a host interface.

2. The system of claim 1, wherein the number of write transactions are received at the processing device from a host that is coupled to the processing device via the host interface.

3. The system of claim 1, wherein the host interface comprises one of:
    a serial advanced technology attachment (SATA);
    peripheral component interconnect express (PCIe); and
    a universal serial bus (USB).

4. The system of claim 1, wherein the processing device is configured to generate data corresponding to the number of spurious transactions based on the number of received write transactions.

5. The system of claim 1, wherein the processing device is configured to:
    retrieve a number of read transactions corresponding to the number of reordered write transactions previously written to the memory; and
    reorder the number of read transactions to a same sequence in which the corresponding number of write transactions were received at the processing device.

6. The system of claim 1, wherein the processing device is configured to encrypt the number of write transactions prior to writing the number of write transactions to the memory.

7. The system of claim 6, wherein the processing device is configured to encrypt the number of write transactions using at least one of an electronic code book (ECB) and a pseudo counter mode (PCTR) technique.

8. The system of claim 6, wherein the processing device is configured to encrypt the number of write transactions using at least one of feedback modes including cipher block chaining (CBC), cipher feedback (CFB), and output feedback (OFB).

9. The system of claim 1, wherein the memory is a non-volatile and byte-addressable memory.

10. A method, comprising:
    reordering a number of read transactions that are retrieved, in a first sequence, from a memory along with a number of spurious transactions; and
    returning, in a second sequence, the number of retrieved read transactions to a host, wherein the second sequence is different than the first sequence.

11. The method of claim 10, further comprising decrypting the number of retrieved read transactions prior to returning the number of retrieved read transactions to the host.

12. The method of claim 10, further comprising randomly generating data corresponding to the number of spurious transactions.

13. The method of claim 10, further comprising discarding the number of spurious transactions among the number of read transactions prior to returning the number of read transactions to the host.

14. The method of claim 10, wherein the first sequence is a reverse order of the second sequence.

15. A non-transitory computer readable medium storing instructions executable by a processing resource to:
    reorder a number of write transactions received at a processing device via a host interface; and
    perform a write operation of the number of reordered write transactions along with a number of spurious transactions to a memory, wherein the number of reordered write transactions are executed in a different sequence than a particular sequence in which they were received at the processing device via the host interface.

16. The medium of claim 15, further comprising instructions executable to generate and insert, among the number of write transactions, the number of spurious transactions at a particular rate.

17. The medium of claim 16, wherein the instructions executable to generate and insert, among the number of write transactions, the number of spurious transactions at the particular rate comprises instructions executable to track locality of write addresses of the number of write transactions and adjust the particular rate in response to a determination that repetitive write to a same address and/or address range reaches a threshold value.

18. The medium of claim 15, wherein the instructions executable to reorder the number of write transactions received at the processing device comprises instructions executable to reorder the number of write transactions in a random order.

19. The medium of claim 15, wherein the instructions executable to reorder the number of write transactions received at the processing device comprises instructions executable to reorder the number of write transactions in a reverse order.

20. The medium of claim 15, further comprising instructions executable to write data corresponding to the number of spurious transactions to a dedicated portion of the memory.

\* \* \* \* \*